United States Patent
French et al.

(10) Patent No.: US 12,033,593 B2
(45) Date of Patent: Jul. 9, 2024

(54) ELECTROPHORETIC DISPLAY DEVICE AND DRIVING METHOD OF ELECTROPHORETIC DISPLAY DEVICE

(71) Applicant: E Ink Holdings Inc., Hsinchu (TW)

(72) Inventors: Ian French, Hsinchu (TW); Po-Yuan Lo, Hsinchu (TW); Xian-Teng Chung, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 17/581,837

(22) Filed: Jan. 21, 2022

(65) Prior Publication Data
US 2022/0319445 A1    Oct. 6, 2022

(30) Foreign Application Priority Data
Mar. 30, 2021   (TW) ................... 110111461

(51) Int. Cl.
G09G 3/34   (2006.01)
G02F 1/167   (2019.01)

(52) U.S. Cl.
CPC ............ *G09G 3/344* (2013.01); *G02F 1/167* (2013.01); *G09G 3/3413* (2013.01); *G09G 2300/0452* (2013.01)

(58) Field of Classification Search
CPC ................. G09G 3/344; G09G 3/3413; G09G 2300/0452; G09G 3/2003; G02F 1/167
See application file for complete search history.

(56) References Cited

U.S. PATENT DOCUMENTS

| | | | |
|---|---|---|---|
| 9,191,657 | B2 | 11/2015 | Kim et al. |
| 2012/0062565 | A1 | 3/2012 | Fuchs et al. |
| 2012/0154392 | A1 | 6/2012 | Kim et al. |
| 2012/0212590 | A1 | 8/2012 | Kang |
| 2015/0091902 | A1 | 4/2015 | Pediredla et al. |
| 2017/0070740 | A1 | 3/2017 | Lawrence et al. |
| 2018/0308414 | A1* | 10/2018 | Kang .................. G09G 3/3685 |
| 2018/0322822 | A1 | 11/2018 | Oka |
| 2021/0132435 | A1* | 5/2021 | Beales ................. G02F 1/1685 |

FOREIGN PATENT DOCUMENTS

TW          201519207          5/2015

OTHER PUBLICATIONS

"Office Action of Taiwan Counterpart Application", issued on Jan. 24, 2022, p. 1-p. 6.

* cited by examiner

*Primary Examiner* — Dennis P Joseph
(74) *Attorney, Agent, or Firm* — JCIPRNET

(57) ABSTRACT

An electrophoretic display device, including an electrophoretic display panel and a display driving module, is provided. The display driving module is coupled to the electrophoretic display panel and is used for driving the electrophoretic display panel. The display driving module generates multiple first grayscale images according to multiple color pixel values of multiple color pixels corresponding to multiple colors of a color image. The display driving module captures multiple grayscale values of multiple locations of multiple first sub-pixels of the first grayscale images according to multiple locations of multiple mask sub-pixels corresponding to the colors in a mask image to generate multiple second grayscale images. The display driving module synthesizes the second grayscale images to generate a synthesized image. The display driving module drives the electrophoretic display panel according to the synthesized image.

3 Claims, 6 Drawing Sheets

ELECTROPHORETIC DISPLAY DEVICE AND DRIVING METHOD OF ELECTROPHORETIC DISPLAY DEVICE

CROSS-REFERENCE TO RELATED APPLICATION

This application claims the priority benefit of Taiwan application serial no. 110111461, filed on Mar. 30, 2021. The entirety of the above-mentioned patent application is hereby incorporated by reference herein and made a part of this specification.

BACKGROUND

Technical Field

The disclosure relates to an electrophoretic display device, and particularly relates to an electrophoretic display device and a driving method of the electrophoretic display device.

Description of Related Art

The electronic paper (e-paper) and electronic book (e-book) adopt electrophoretic display (EPD) technology to achieve the objective of display. Taking an e-book displaying black and white as an example, the display medium of an electrophoretic display is mainly composed of an electrophoresis fluid and black and white charged particles mixed in the electrophoresis fluid. Through applying voltage, the black and white charged particles may be driven to move, so that each pixel may respectively display a black, white, or gray scale.

In the prior art, the electrophoretic display mostly uses the reflection of an external light source to achieve the objective of display, and through driving the black and white charged particles mixed in the electrophoresis fluid by voltage, each pixel may display the required grayscale. Furthermore, in order to expand the application of the electrophoretic display, a color filter array (CFA) may also be disposed on the electrophoretic display film. At this time, the color of the electrophoretic display is mainly displayed by after passing an external light through the CFA, the charged particles in the electrophoresis fluid reflect the external light and then penetrate the CFA for display.

Generally speaking, the CFA is mainly composed of multiple filter patterns with different colors, and the filter patterns with different colors respectively correspond to pixel units on a driving array substrate. The electrophoretic display uses the white charged particles and the black charged particles to absorb and reflect light, and then presents a color display screen together with red, blue, and green filter patterns.

In detail, when rendering a color image into a color display screen, the prior art regards multiple pixels of the color image as a set of image units, and respectively takes average values of different colors of multiple sets of image units of the color image. Then, the electrophoretic display restores the corresponding image units into multiple pixels according to the average values to present the color display screen. However, after the processes of averaging and restoring, the image quality of the output color display screen will be inferior to the original color image, and some details will be lost.

SUMMARY

The disclosure provides an electrophoretic display device and a driving method of the electrophoretic display device, which can have better image quality and details when rendering a color image into a color display screen.

The electrophoretic display device of the disclosure includes an electrophoretic display panel and a display driving module. The display driving module is coupled to the electrophoretic display panel and is used for driving the electrophoretic display panel. The display driving module generates multiple first grayscale images according to multiple color pixel values of multiple color pixels corresponding to multiple colors of a color image. The display driving module captures multiple grayscale values of multiple locations of multiple first sub-pixels corresponding to the first grayscale images according to multiple locations of multiple mask sub-pixels corresponding to the colors in a mask image to generate multiple second grayscale images. The display driving module synthesizes the second grayscale images to generate a synthesized image. The display driving module drives the electrophoretic display panel according to the synthesized image.

The driving method of the electrophoretic display device of the disclosure includes the following steps. Multiple first grayscale images are generated according to multiple color pixel values of multiple color pixels corresponding to multiple colors of a color image through a display driving module. Multiple grayscale values of multiple locations of multiple first sub-pixels corresponding to the first grayscale images are captured according to multiple locations of multiple mask sub-pixels corresponding to the colors in a mask image through the display driving module to generate multiple second grayscale images. The second grayscale images are synthesized through the display driving module to generate a synthesized image. The electrophoretic display panel is driven through the display driving module according to the synthesized image.

Based on the above, the electrophoretic display device and the driving method of the electrophoretic display device of the disclosure can have better image quality and details when rendering the color image into the color display screen.

DETAILED DESCRIPTION OF DISCLOSED EMBODIMENTS

Figure 1A:
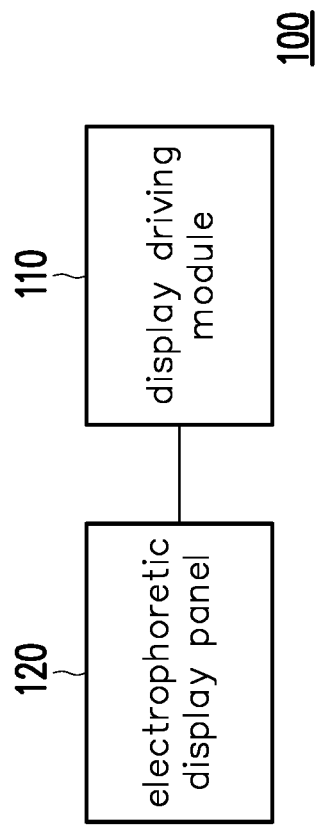
FIG. 1A is a circuit block diagram of an electrophoretic display device according to an embodiment of the disclosure.

FIG. 1A is a circuit block diagram of an electrophoretic display device according to an embodiment of the disclosure. Referring to FIG. 1A, an electrophoretic display device 100 includes a display driving module 110 and an electrophoretic display panel 120. The display driving module 110 is coupled to the electrophoretic display panel 120 and is used for driving the electrophoretic display panel 120. In this embodiment, the electrophoretic display device 100 may include a reflective electrophoretic display device. In addition, the display driving module 110 may include a thin-film transistor (TFT) array, and the TFT array may include multiple top-gate TFTs or multiple bottom-gate TFTs, and the disclosure is not limited thereto. Furthermore, the electrophoretic display panel 120 may include multiple electrophoretic display media 121. For example, the electrophoretic display medium 121 may include a microcapsule electrophoretic display medium, and the microcapsule electrophoretic display medium may include an electrophoresis fluid, multiple white charged particles, and multiple black charged particles, and the disclosure is not limited thereto.

Figure 1B:
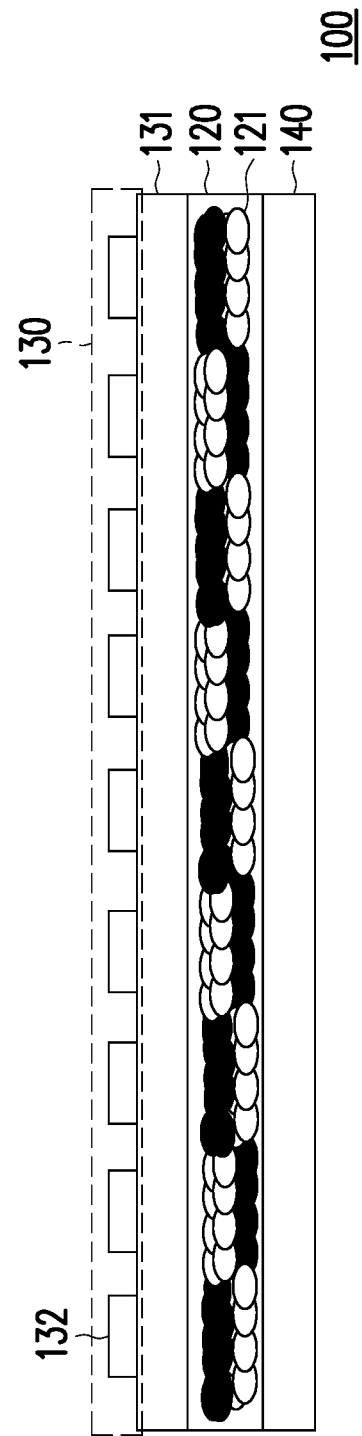
FIG. 1B is a schematic cross-sectional diagram of a portion of the electrophoretic display device according to an embodiment of the disclosure.

FIG. 1B is a schematic cross-sectional diagram of a portion of the electrophoretic display device 100 according to an embodiment of the disclosure. For convenience of description, some elements are omitted in FIG. 1B. Referring to FIG. 1B, the electrophoretic display device 100 further includes a color filter array 130 and a substrate 131. The color filter array 130 is disposed on the electrophoretic display panel 120, and the color filter array 130 includes multiple filter patterns 132 and is formed on the substrate 131. The substrate 131 may be a transparent substrate, that is, the color filter array 130 is formed on the substrate 131 first, and the substrate 131 is then attached onto the electrophoretic display medium 121. In another embodiment of the disclosure, the substrate 131 may be a film layer on the electrophoretic display medium 121, and the color filter array 130 is formed on the substrate 131 by spray coating or transfer printing.

In addition, the filter pattern 132 may be disposed corresponding to an array circuit 140 controlling the electrophoretic display medium 121. In other words, the display driving module 110 of the electrophoretic display device 100 may control the distribution of the electrophoretic display medium 121 via the array circuit 140. In this way, the display screen of the electrophoretic display device 100 may display the corresponding color via the color filter array 132, and the brightness value may be adjusted via driving the electrophoretic display medium 121 to display a color screen. The electrophoretic display medium 121 shown in the drawing is a microcapsule electrophoretic display medium 121, but the disclosure is not limited thereto, and the electrophoretic display medium 121 with a microcup structure or other forms is also within the scope of the disclosure.

Figure 1C:
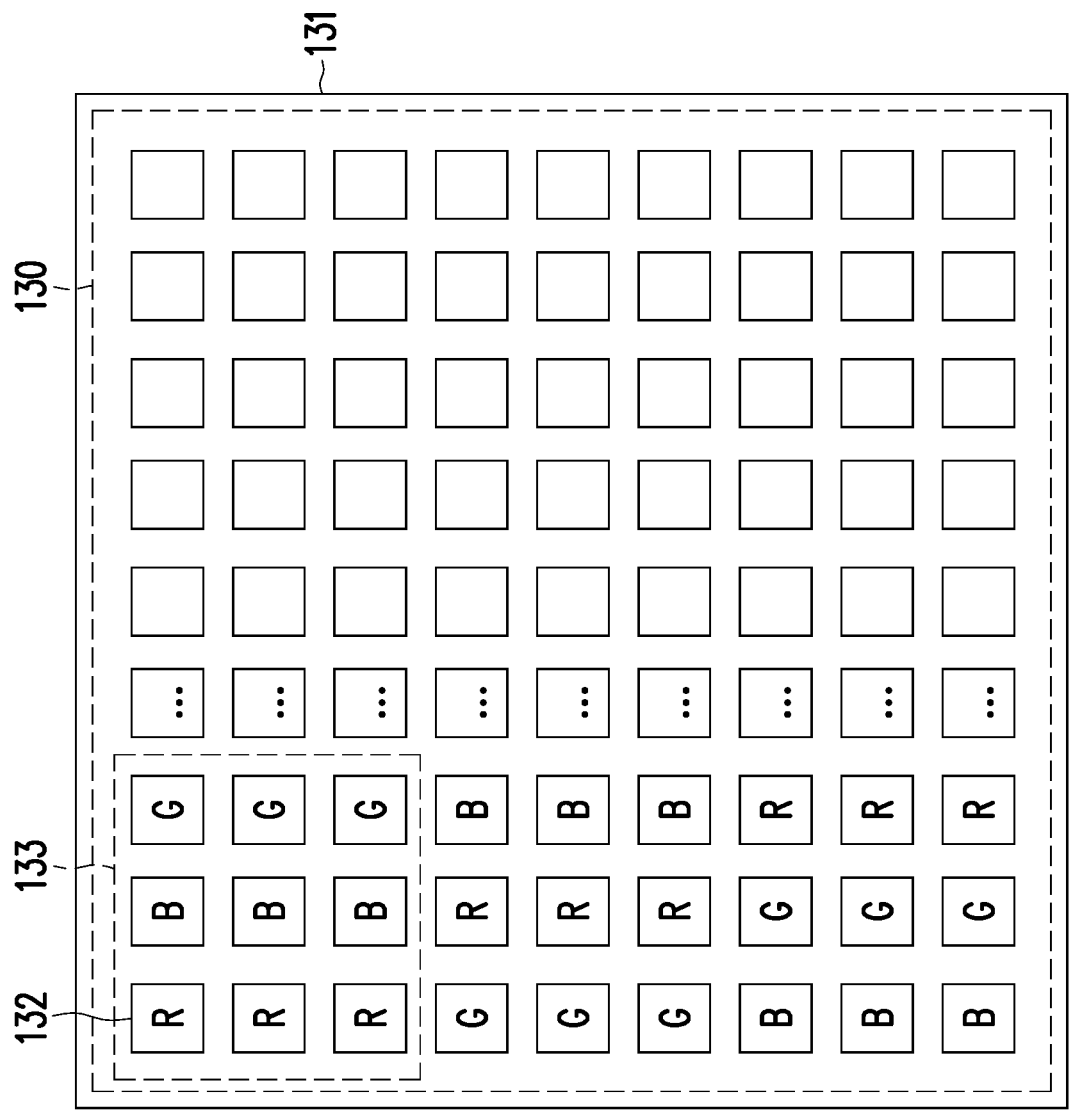
FIG. 1C is a schematic diagram of a color filter array according to an embodiment of the disclosure.

FIG. 1C is a schematic diagram of a color filter array according to an embodiment of the disclosure. Referring to FIG. 1C, the color filter array 130 includes the transparent substrate 131 and the filter patterns 132. The filter patterns 132 may form multiple pattern units 133. In this embodiment, the filter patterns 132 may form the pattern unit 133 in a manner of 3 by 3. In an embodiment, the filter patterns 132 may form the pattern unit 133 in a manner of 2 by 2, 1 by 3, etc., and the disclosure is not limited thereto. In this embodiment, R, B, and G in FIG. 1C may respectively represent red, blue, and green. In other words, the filter patterns 132 marked with R, B, and G are respectively red, blue, and green filter patterns 132. In this embodiment, the pattern units 133 may be composed of the arrangement of different filter patterns 132. In an embodiment, the pattern units 133 may be composed of the arrangement of the same filter patterns 132, and the disclosure is not limited thereto. In other words, the arrangement of the pattern units 133 and the number or the color of the included filter patterns 132 may be modified according to design requirements, and the disclosure is not limited thereto.

Figure 2:
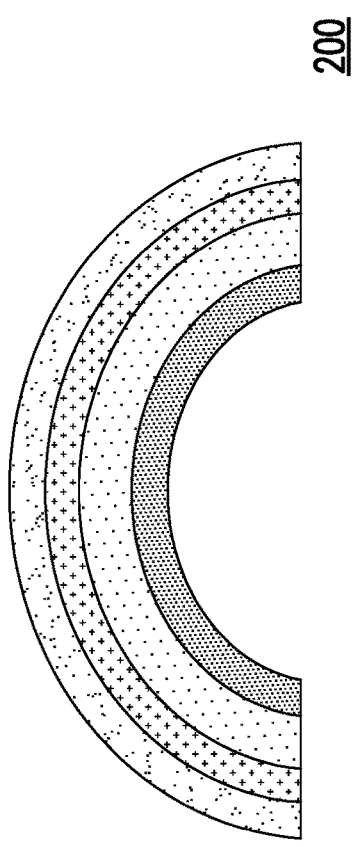
FIG. 2 is a schematic diagram of a color image according to an embodiment of the disclosure.
Figure 3:
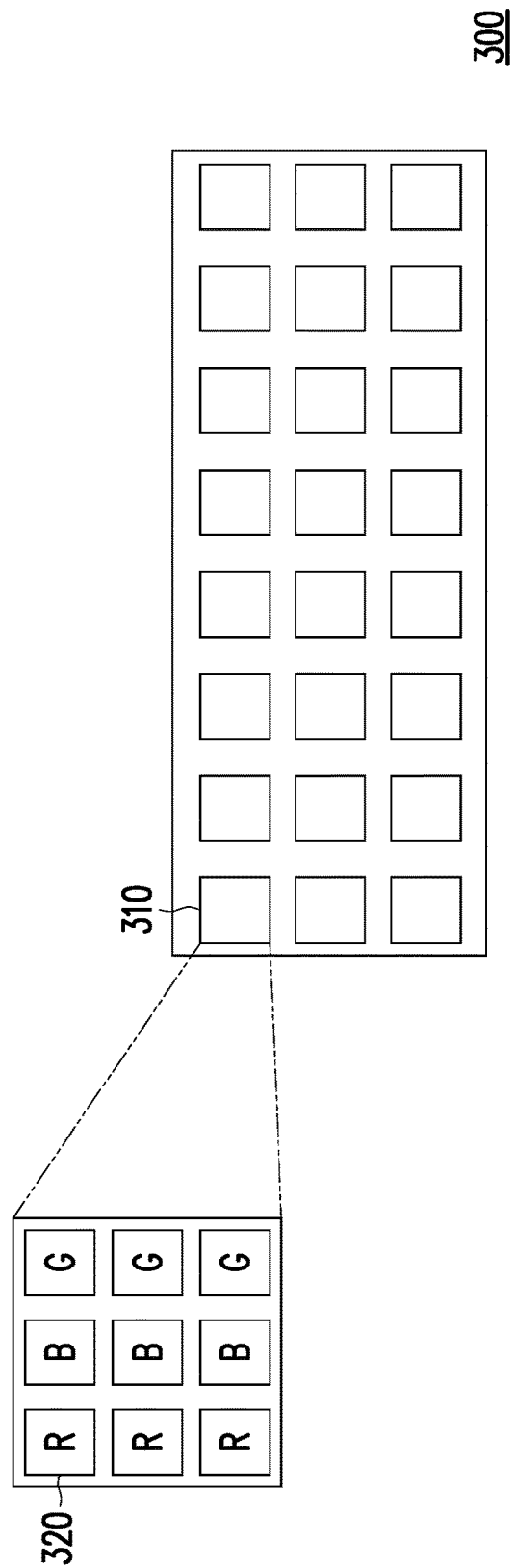
FIG. 3 is a schematic diagram of a mask image according to an embodiment of the disclosure.

FIG. 2 is a schematic diagram of a color image according to an embodiment of the disclosure. FIG. 3 is a schematic diagram of a mask image according to an embodiment of the disclosure. Referring to FIG. 1A to FIG. 3, a color image 200 may include multiple color pixels (not shown), and the color pixels may have various different colors. In addition, a mask image 300 may include multiple mask pixels 310. In addition, each of the mask pixels 310 includes multiple mask sub-pixels 320, and the mask sub-pixels 320 may have various different colors. In this embodiment, the colors may include red, blue, and green, and the disclosure is not limited thereto. It should be noted that in order for the display driving module 110 to correctly display the color image 200, the filter patterns 132 of the color filter array 130 and the mask sub-pixels 320 of the mask image 300 may have the same arrangement. In other words, for each of the mask sub-pixels 320 of the mask image 300, the corresponding filter pattern 132 may be found in the color filter array 130. Similarly, for each of the mask pixels 310 of the mask image 300, the corresponding pattern unit 133 may be found in the color filter array 130. In addition, the display driving module 110 may capture the color pixels corresponding to the different colors in the color image 200 according to multiple locations of the mask sub-pixels 320 corresponding to the respective colors in the mask image 300. In this way, the electrophoretic display device 100 may render the color image 200 into a color display screen via the mask image 300. In addition, the electrophoretic display device 100 may output the color display screen via the color filter array 130. Therefore, the color display screen output by the electrophoretic display device 100 can have better image quality and details.

Figure 4:
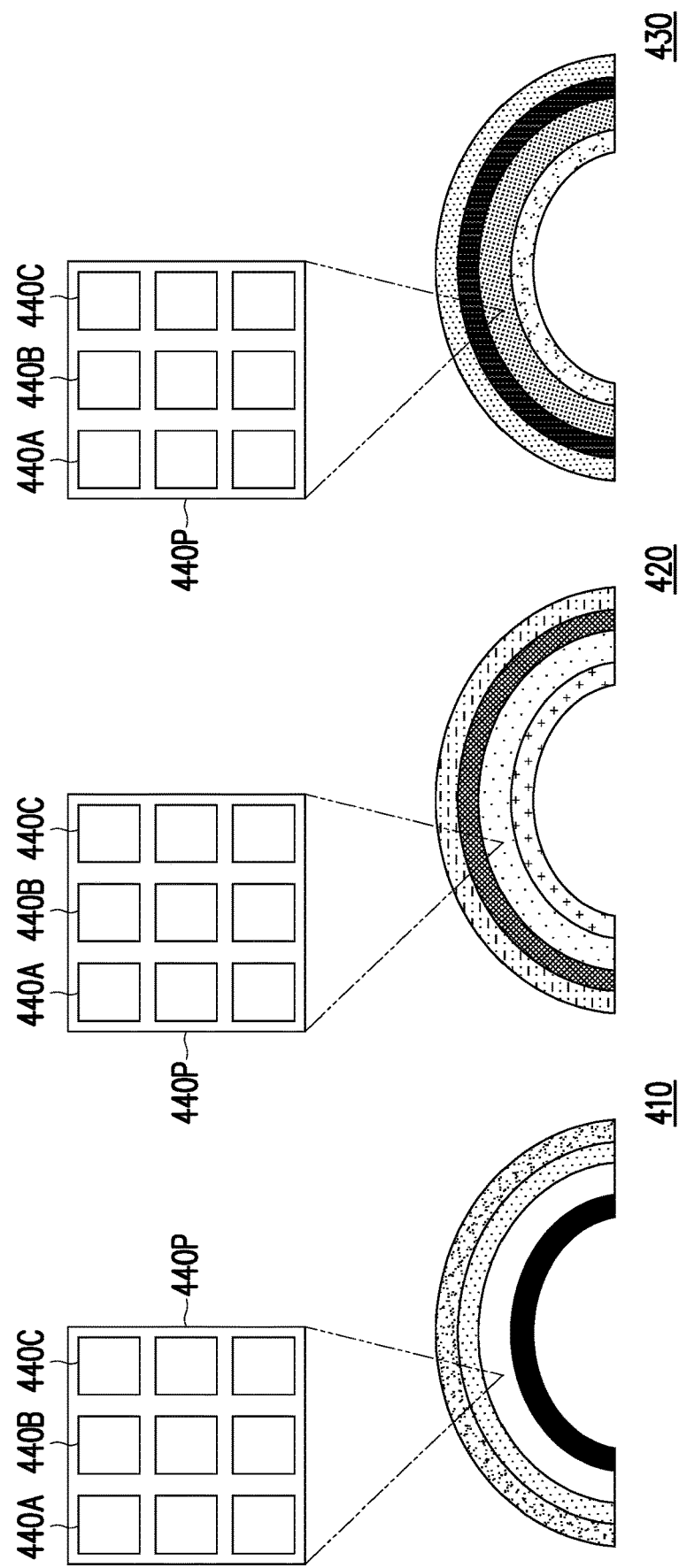
FIG. 4A is a schematic diagram of a first grayscale image according to an embodiment of the disclosure.
FIG. 4B is a schematic diagram of a first grayscale image according to an embodiment of the disclosure.
FIG. 4C is a schematic diagram of a first grayscale image according to an embodiment of the disclosure.
Figure 5:
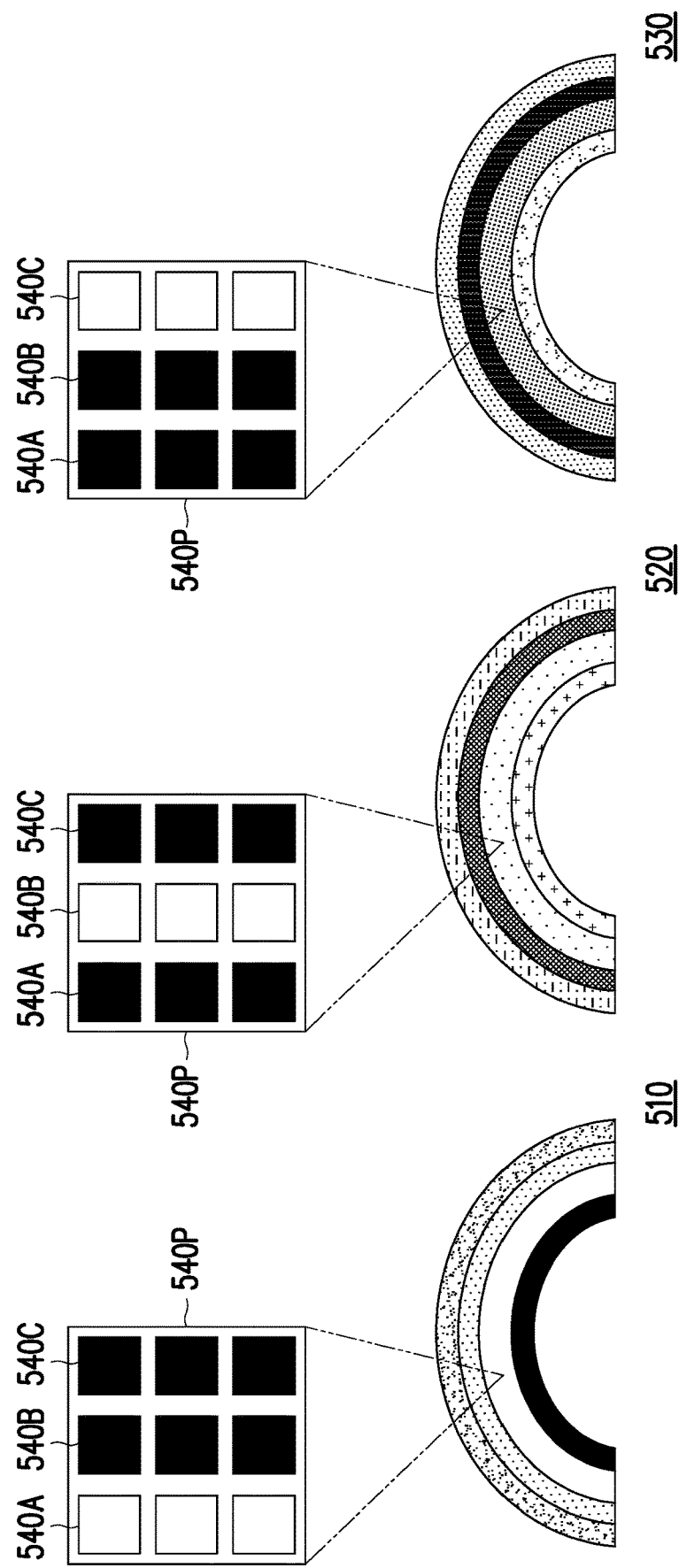
FIG. 5A is a schematic diagram of a second grayscale image according to an embodiment of the disclosure.
FIG. 5B is a schematic diagram of a second grayscale image according to an embodiment of the disclosure.
FIG. 5C is a schematic diagram of a second grayscale image according to an embodiment of the disclosure.

FIG. 4A to FIG. 4C are schematic diagrams of first grayscale images according to an embodiment of the disclosure. FIG. 5A to FIG. 5C are schematic diagrams of second grayscale images according to an embodiment of the disclosure. Referring to FIG. 1A to FIG. 4C first, in this embodiment, when the electrophoretic display device 100 needs to render the color image 200 into the color display screen, the display driving module 110 may generate multiple first grayscale images 410, 420, and 430 according to the color pixel values of the color pixels corresponding to the colors of the color image 200. In this embodiment, the colors may include red, blue, and green, and the disclosure is not limited thereto. In other words, the display driving module 110 may generate the first grayscale image 410 shown in FIG. 4A according to red pixel values of the color pixels corresponding to red of the color image 200. The display driving module 110 may generate the first grayscale image 420 as shown in FIG. 4B according to blue pixel values of the color pixels corresponding to blue of the color image 200. The display driving module 110 may generate the first grayscale image 430 shown in FIG. 4C according to green pixel values the color pixels corresponding to green of the color image 200.

Specifically, the display driving module 110 may use the color pixel values of the color pixels corresponding to the colors of the color image 200 as multiple first grayscale values of the respective first grayscale images 410, 420, and 430 corresponding to the different colors. In addition, the first grayscale images 410, 420, and 430 include multiple first pixels 440P, and each of the first pixels 440P includes multiple first sub-pixels 440A, 440B, and 440C. The grayscale values of the first sub-pixels 440A, 440B, and 440C are the same as the grayscale value of the corresponding first pixel 440P. In other words, the display driving module 110 may use the red pixel values of the color pixels of the color image 200 as the first grayscale values of the first pixels 440P and the first sub-pixels 440A, 440B, and 440C of the first grayscale image 410 corresponding to red. The display driving module 110 may use the blue pixel values of the color pixels of the color image 200 as the first grayscale values of the first pixels 440P and the first sub-pixels 440A, 440B, and 440C of the first grayscale image 420 corresponding to blue. The display driving module 110 may use the green pixel values of the color pixels of the color image 200 as the first grayscale values of the first pixels 440P and the first sub-pixels 440A, 440B, and 440C of the first grayscale image 430 corresponding to green.

For example, a certain color pixel in the color image 200 has a red pixel value of 255, a blue pixel value of 120, and a green pixel value of 0. Therefore, when the display driving module 110 converts the color image 200 into the first grayscale image 410 corresponding to red, the grayscale value corresponding to a certain first pixel 440P in the first grayscale image 410 is 255, and the grayscale values of the first sub-pixels 440A, 440B, and 440C included in the certain first pixel 440P are also 255. Similarly, when the display driving module 110 converts the color image 200 into the first grayscale image 420 corresponding to green, the grayscale value of the first grayscale image 420 corresponding to a certain first pixel 440P is 120, and the grayscale values of the first sub-pixels 440A, 440B, and 440C included in the certain first pixel 440P are also 120. Similarly, when the display driving module 110 converts the color image 200 into the first grayscale image 430 corresponding to blue, the grayscale value corresponding to a certain first pixel 440P in the first grayscale image 430 is 0, and the grayscale values of the first sub-pixels 440A, 440B, and 440C included in the certain first pixel 440P are also 0. In this embodiment, the grayscale value of 0 is black.

Next, referring to FIG. 1A to FIG. 5C, the display driving module 110 may capture multiple grayscale values of multiple locations of multiple first sub-pixels 540A, 540B, and 540C corresponding to the first grayscale images 410, 420, and 430 according to the locations of the mask sub-pixels 320 corresponding to the colors in the mask image 300 to generate multiple second grayscale images 510, 520, and 530. Specifically, in order for the display driving module 110 to correctly display the color image 200, the filter patterns 132 of the color filter array 130 and the mask sub-pixels 320 of the mask image 300 may have the same arrangement. In other words, for each of the mask sub-pixels 320 of the mask image 300, the corresponding filter pattern 132 may be found in the color filter array 130. Similarly, for each of the mask pixels 310 of the mask image 300, the corresponding pattern unit 133 may be found in the color filter array 130. In addition, the filter pattern 132 may be disposed corresponding to the array circuit 140 of the electrophoretic display medium 121. In other words, from the perspective of the electrophoretic display panel 120, in order for each of the pattern units 133 and the corresponding electrophoretic display media 121 to correctly display each of the color pixels of the corresponding color image 200, the first grayscale images 410, 420, and 430 may be converted via the mask image 300 to become the second grayscale images 510, 520, and 530.

In more detail, the display driving module 110 captures the first grayscale values of different portions of the first grayscale images 410, 420, 430 corresponding to the different colors according to the locations of the mask sub-pixels 320 corresponding to the respective colors in the mask image 300 to respectively generate the second grayscale images 510, 520, and 530 corresponding to the different colors. In addition, in the second grayscale images 510, 520, and 530, the respective grayscale values of the locations of the mask sub-pixels 320 with non-corresponding colors are 0.

For example, the arrangement of the filter patterns 132 in the pattern unit 133 of a certain color pixel for displaying the color image 200 is arranged as shown by the dotted box on the upper left of FIG. 1C. Therefore, the corresponding first pixel 440P of the first grayscale images 410, 420, and 430 may be converted via the mask pixel 310 on the upper left of the mask image 300 as shown in FIG. 3 to generate the second grayscale images 510, 520, and 530 corresponding to the different colors. In other words, since the color of the filter patterns 132 and the left three of the mask pixel 310 are all red, when a certain first pixel 440P of the first grayscale image 410 is converted into the second grayscale image 510 corresponding to red, only the grayscale values of the left three first sub-pixels 440A are captured as the grayscale value of the second grayscale image 510, and the grayscale values of the remaining first sub-pixels 440B and 440C are 0. Similarly, since the color of the filter patterns 132 and the middle three of the mask pixel 310 are all blue, when a certain first pixel 440P of the first grayscale image 420 is converted into the second grayscale image 520 corresponding to blue, only the grayscale values of the middle three first sub-pixels 440B are captured as the grayscale values of the second grayscale image 520, and the grayscale values of the remaining first sub-pixels 440A and 440C are 0. Similarly, since the color of the filter patterns 132 and the right three of the mask pixel 310 are all green, when a certain first pixel 440P of the first grayscale image 430 is converted into the second grayscale image 530 corresponding to green, only the grayscale values of the right three first sub-pixels 440B are captured as the grayscale values of the second grayscale image 530, and the grayscale values of the remaining first sub-pixels 440A and 440C are 0.

Finally, the display driving module 110 may synthesize the second grayscale images 510, 520, and 530 to generate a synthesized image that looks like the original color image 200. In this way, the display driving module 110 may drive the electrophoretic display panel 120 to display an image screen according to the synthesized image.

Figure 6:
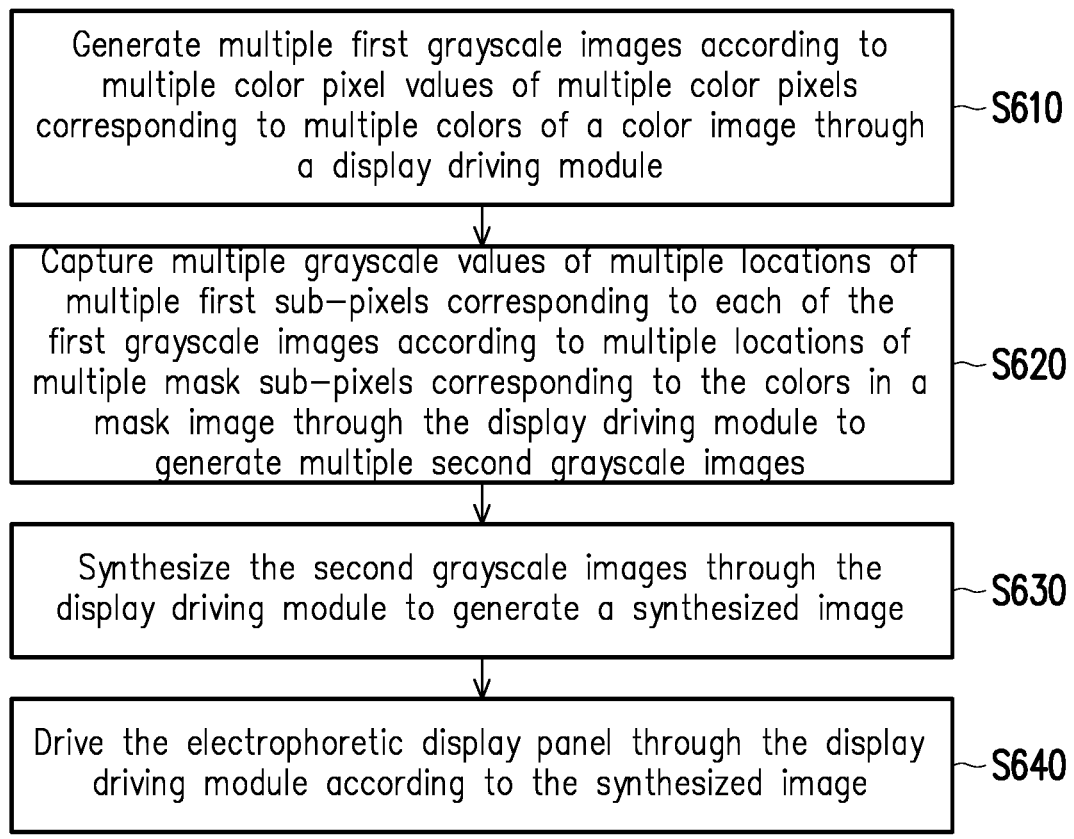
FIG. 6 is a flowchart of a driving method of an electrophoretic display panel according to an embodiment of the disclosure.

The following summarizes the driving method of the electrophoretic display panel described in FIG. 1A to FIG. 5C. FIG. 6 is a flowchart of a driving method of an electrophoretic display panel according to an embodiment of the disclosure. Referring to FIG. 6, in Step S610, a display driving module of the disclosure generates multiple first grayscale images according to multiple color pixel values of multiple color pixels corresponding to multiple colors of a color image. In Step S620, the display driving module of the disclosure captures multiple grayscale values of multiple locations of multiple first sub-pixels corresponding to each of the first grayscale images according to multiple locations of multiple mask sub-pixels corresponding to the colors in a mask image to generate multiple second grayscale images. In Step S630, the display driving module of the disclosure synthesizes the second grayscale images to generate a synthesized image. In Step S640, the display driving module of the disclosure drives the electrophoretic display panel according to the synthesized image.

In summary, the electrophoretic display device 100 of the disclosure may render the color image 200 into the color display screen via the mask image 300. In addition, the electrophoretic display device 100 may output the color display screen via the color filter array 130. Therefore, the color display screen output by the electrophoretic display device 100 can have better image quality and details.

What is claimed is:

1. An electrophoretic display device, comprising:
   an electrophoretic display panel; and
   a display driving module, coupled to the electrophoretic display panel and used for driving the electrophoretic display panel, wherein
      the display driving module generates a plurality of first grayscale images according to a plurality color pixel values of a plurality of color pixels corresponding to a plurality of colors of a color image,
      the display driving module captures a plurality of grayscale values of a plurality of locations of a plurality of first sub-pixels corresponding to a plurality of first grayscale images according to a plurality of locations of a plurality of mask sub-pixels corresponding to the colors in a mask image to generate a plurality of second grayscale images,
      the display driving module synthesizes the second grayscale images to generate a synthesized image, and
      the display driving module drives the electrophoretic display panel according to the synthesized image; and
   a color filter array, disposed on the electrophoretic display panel and comprising a plurality of filter patterns, and the plurality of filter patterns form a plurality of pattern units, wherein the filter patterns of the pattern units of the color filter array and the mask sub-pixels of a plurality of mask pixels of the mask image have a same arrangement, so that the mask pixels of the mask image respectively correspond to the pattern units of the color filter array, and the mask sub-pixels of the mask image respectively correspond to the filter patterns of the color filter array, wherein the mask sub-pixels have red, blue, and green colors,
   wherein the display driving module uses the color pixel values of the color pixels corresponding to each of the colors of the color image as a plurality of first grayscale values of the first sub-pixels of the respective first grayscale images corresponding to the different colors,
   wherein the display driving module captures the first grayscale values of different portions of the first grayscale images corresponding to the different colors according to the locations of the mask sub-pixels corresponding to the respective colors in the mask image to respectively generate the second grayscale images corresponding to the different colors, wherein
      a plurality of respective grayscale values of the locations of the mask sub pixels with non-corresponding colors in the second grayscale images are 0.

2. The electrophoretic display device according to claim 1, wherein the electrophoretic display device comprises a reflective electrophoretic display device.

3. A driving method of an electrophoretic display device, comprising:
   generating, through a display driving module, a plurality of first grayscale images according to a plurality of color pixel values of a plurality of color pixels corresponding to a plurality of colors of a color image;
   capturing, through the display driving module, a plurality of grayscale values of a plurality of locations of a plurality of first sub-pixels corresponding to the first grayscale images according to a plurality of locations of a plurality of mask sub-pixels corresponding to the colors in a mask image to generate a plurality of second grayscale images;
   synthesizing, through the display driving module, the second grayscale images to generate a synthesized image; and
   driving, through the display driving module, an electrophoretic display panel according to the synthesized image,
   wherein a color filter array is disposed on the electrophoretic display panel and comprises a plurality of filter patterns, and the plurality of filter patterns form a plurality of pattern units, and the filter patterns of the pattern units of the color filter array and the mask sub-pixels of a plurality of mask pixels of the mask image have a same arrangement, so that the mask pixels of the mask image respectively correspond to the pattern units of the color filter array, and the mask sub-pixels of the mask image respectively correspond to the filter patterns of the color filter array, wherein the mask sub-pixels have red, blue, and green colors,
   wherein the step of generating the first grayscale images comprises:
      using, through the display drive module, the color pixel values of the color pixels corresponding to each of the colors of the color image as a plurality of first grayscale values of the respective first grayscale images corresponding to the different colors,
   wherein the step of generating the second grayscale images comprises:
      capturing, through the display driving module, the first grayscale values of different portions of the first grayscale images corresponding to the different colors according to the locations of the mask sub-pixels corresponding to the respective colors in the mask image to respectively generate the second grayscale images corresponding to the different colors, wherein
      a plurality of respective grayscale values of the locations of the mask sub-pixels with non-corresponding colors in the second grayscale images are 0.

* * * * *